Feb. 24, 1970   J. E. SOMMERVILLE   3,496,639
CHART READING DEVICE
Filed May 26, 1967
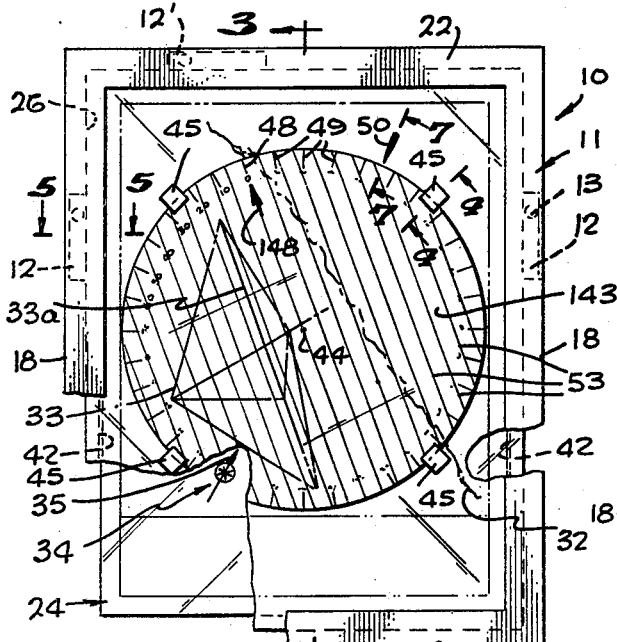
INVENTOR.
JOHN E. SOMMERVILLE
BY William P. Green
ATTORNEY United States Patent Office 3,496,639
Patented Feb. 24, 1970

3,496,639
CHART READING DEVICE
John E. Sommerville, 1500 Forest Knoll Drive,
Los Angeles, Calif. 90069
Filed May 26, 1967, Ser. No. 641,655
Int. Cl. G01c 21/20
U.S. Cl. 33—1                                    1 Claim

ABSTRACT OF THE DISCLOSURE

A chart reading device forming a pocket into which a piloting chart may be inserted and having a transparent wall carrying a rotatable transparent disc, with the chart being visible through both the disc and the transparent wall. The disc has a plurality of parallel markings, and in use is turned to a position in which those markings are aligned with a particular desired path of travel on the chart, in which position coacting markings on the disc and transparent wall indicate the course to be followed in order to travel along that path, with the course desirably being given with respect to the magnetic rather than true north.

BACKGROUND OF THE INVENTION

This invention relates to devices for facilitating the reading of course directions on charts representing coastal areas and the like, in order to determine what course should be steered to travel between a particular pair of locations on the chart.

In piloting a small boat from place to place within a particular area, it frequently becomes desirable to determine the course to be steered in order to reach a desired destination. However, to calculate that course by conventional methods is often very inconvenient. Normally, it is necessary to follow a procedure consisting of several successive steps, involving the use of parallel rulers or other known devices, and requiring performance of those steps in a prescribed manner, ultimately calculating in the magnetic variation for the area in order to determine the proper magnetic course to follow. The difficulties involved in reading a chart in this manner, and the time consumed, may be just great enough to dissuade a person from properly charting the course, with the result that he may merely approximate the proper heading visually or otherwise and consequently in most cases follow a less direct route than would be desired.

Further, since the reading of a chart in this way must usually be done in a chart room or other area providing a work table or the like, a person may be completely precluded from attempting to read a chart in this manner if it is necessary that he remain at the helm of the boat.

SUMMARY OF THE INVENTION

A device embodying the present invention enables reading of a chart very rapidly with a single very easily performed manipulation of the device, and in a manner which can be easily and quickly understood by anyone, even without any substantial prior training in chart interpretation. Further, the device is preferably adapted to give the desired course reading directly in magnetic degrees (or if desired magnetic compass points), that is, with the magnetic variation for the particular area automatically calculated into the reading, and without the necessity for final conversion from a true course to a magnetic course.

A further feature of the invention resides in the capability of the present devices to be utilized in conjunction with any chart which is of appropriate size to fit into the device, or can be cut to an appropriate size, so that as a person travels from one area to another, he can merely remove a first chart and place in the device a second chart, and then be ready for use of the unit in reading course directions on the second chart.

Structurally, the chart reading device includes a transparent wall behind which the chart is positioned at a location to be viewed through the wall, and with another transparent element being mounted for rotation relative to the wall, and at a position such that the chart may be viewed through both the wall and that rotary transparent element. The rotary element, which is desirably in the form of a disc, has a plurality of parallel markings formed thereon, and may be turned to a position in which these markings are aligned with a particular desired path of travel on the chart. Coacting markings on the rotary element and associated with the transparent wall indicate directly to a user the course to be steered in traveling along the path to which the rotary disc has been set.

The transparent wall preferably forms the front wall of a pocket into which the chart is insertible, with that pocket being shaped, desirably rectangularly, to hold the chart in a particular orientation with respect to the transparent wall. One of the coacting markings may be carried by the transparent wall, and be shiftable from place to place thereon, to thereby alter the magnetic variation which is preset into the device for reading a particular chart. Normally, most boats will of course remain in a certain general area in which the variation will be constant, so that such movement of the index marking carried by the transparent wall will be required very seldom.

BRIEF DESCRIPTION OF THE DRAWING

A preferred embodiment of the invention is illustrated in the drawing, in which:

FIG. 1 is a front elevational view of a chart reading device embodying the invention, with portions of the device broken away to facilitate understanding of its structure;

FIG. 2 is an exploded perspective representation of the various components of the FIG. 1 device;

FIG. 3 is an enlarged interrupted vertical section taken on line 3—3 of FIG. 1;

FIGS. 4 and 5 are enlarged sections taken on lines 4—4 and 5—5 respectively of FIG. 1;

FIG. 6 is a fragmentary view taken on line 6—6 of FIG. 5;

FIG. 7 is a section taken on line 7—7 of FIG. 1; and

FIG. 8 shows a variation of the invention.

DESCRIPTION OF A PREFERRED EMBODIMENT

With regard first to FIG. 1, I have illustrated at 10 a chart reading device embodying the invention, and adapted to be removably attached to a bulkhead of a boat or ship, at any convenient location, and preferably at a point at which the helmsman may have ready access to the unit. The device includes an outer rectangular frame 11 having brackets 12 at its rear side for detachable connection to a pair of screws 13 attached to the bulkhead of the boat. In FIG. 5, the bulkhead is represented at 14, with its outer surface being designated 15, and with one of the screws 13 being represented and having a head 16 for connection to the frame. Brackets 12 may be simple vertical sheet metal elements or plates (FIGS. 5 and 6), received within recesses 17 formed in the backsides of the two vertical elements 18 of the frame, and secured to the frame by a pair of screws 19 (FIG. 6). Each of the bracket plates 12 desirably contains a vertically extending slot 20, having a lower enlarged portion 21 through which head 16 of one of the coacting bulkhead mounted screws 13 may be passed. The portion of the slot above this enlarged lower portion 21 is narrower, so that after the brackets 12 have been moved inwardly far enough to pass the screw heads into the slots, the frame may be moved downwardly to the FIG. 6 position in order to secure the frame against detachment from the bulkhead. The two parallel vertical opposite side members 18 of frame 11 are of course interconnected at their upper and lower ends by top and bottom horizontal parallel frame members 22 and 23 (FIGS. 1 and 2). The frame may be formed of any convenient material, such as wood, metal, a resinous plastic material, or the like.

Removably carried by the frame, there is a chart holding assembly 24 (FIG. 2), which may be backed up by a rigid rectangular backing wall 25 typically formed of composition wood, cardboard or any other appropriate material. The chart holding assembly 24 may have the same rectangular peripheral configuration as member 25, and be received and confined therewith in a rectangular recess 26 formed in the rear side of the frame, with this retention being essentially the same as in a conventional picture frame arrangement. Chart holder 24 and the backing member 25 may be retained within the frame in a suitable manner, as by means of a plurality of holding elements 27 (FIG. 6), pivotally attached to the frame by screws or other retaining elements 28, and adapted to be turned about the screws between the full line active position of FIG. 6 and a retracted or open position such as that represented in broken lines at 27' in that figure. Retaining elements such as that shown at 27 in FIG. 6 may be provided on each of the vertical members 18, and also on the horizontal members 22 and 23 if desired.

In FIG. 2 and the other figures, the chart itself is represented at 29, and consists of a rectangular piece of paper having two vertical opposite side edges 30 and two horizontal upper and lower edges 31 and 32. On the face of the chart, there may be represented a coastline or other land body illustrated at 32, and there may also be indicated on the chart a number of straight line courses illustrated at 33, for traveling between buoys, markers or other predetermined locations in the water. Charts of this type are frequently prepared to illustrate the sailboat racing courses which are customarily employed in the area in question. The chart also has the usual "compass rose" 34 on its face, including an arrow 35 whose direction indicates the direction of magnetic north on the chart, assuming that true north is parallel to the side edges 30 of the chart.

The holder 24 within which the chart is removably receivable includes two identically shaped rectangular front and rear walls 36 and 37, which walls are desirably substantially rigid, and are dimensioned to fit closely within the rectangular recess 26 at the rear side of the frame 11. These walls are slightly larger than the chart 29, to project therebeyond in all directions, and form a rectangular pocket between the two walls adapted to exactly receive chart 29 and hold it in a proper vertical orientation with respect to walls 36 and 37.

In order to form the desired pocket between the two walls 36 and 37, these walls are secured together along three of their four sides, desirably along their upper edges 31 and opposite side edges 30. These edges may be secured together in any manner, as by an appropriate cement or other adhesive, or by merely heat sealing or otherwise bonding their edges directly together. To allow for proper spacing of the walls for reception of the chart, there may be provided an elongated narrow horizontal strip 38 (FIG. 3), of an appropriate resinous plastic material or other substance, between the upper edge portions of the walls 36 and 37, and two similar elongated vertical strips 39 (FIG. 5) between the side edges of the walls, with these three strips being cemented or bonded to the walls to secure them together. At their lower edges, walls 36 and 37 are not secured together, but rather are left open so that the chart may be inserted upwardly between the lower edges of these walls to the position illustrated in FIG. 3. The top strip 38 between the two walls 36 and 37 has a bottom edge 41 which extends horizontally and parallel to top edge 31 of the chart, while the two opposite side strips 39 form vertical edges 42 (FIGS. 1 and 5) extending parallel to and closely proximate to side edges 30 of the chart, to form the desired rectangular pocket for receiving and closely confining the chart in the FIG. 1 position.

The front wall 36 of holder 24 is transparent, so that the chart may be viewed by a user through that wall. The back wall 37 may also be transparent, with both of these walls 36 and 37 desirably being formed of an appropriate transparent resinous plastic material, such as methyl methacrylate or a vinyl material.

To the front side of front wall 36, there is mounted rotatably a transparent indicator disc 43, lying in a vertical plane parallel to the planes of walls 36 and 37, and mounted to turn about a horizontal axis 44 (FIG. 3) extending transversely of elements 36, 37, and 43, and also transversely of the chart 29. The disc may be mounted for rotation about this axis by bearing elements 45 (FIG. 1) secured to the outer surface of transparent wall 36 and having recesses 46 (FIG. 4) centered about axis 44 and engaging the periphery of the disc to center it and prevent any motion of the disc other than the desired rotary motion about axis 44. Bearing elements 45 may be secured to the transparent wall 36 in any appropriate manner, as by cementing them to the wall at 47 (FIG. 4). The bearing elements 45 and their cement are also preferably transparent, to enable viewing of the chart through these bearing elements as well as through disc 43 and the transparent wall 36.

The disc has a zero degree or "North" marking 48 near its periphery, with other degree markings 49 being provided at evenly circularly spaced points about the periphery of the disc, preferably at one degree intervals. These markings are numbered in a counterclockwise direction, that is, in a direction the reverse of that usually employed in designating courses.

In addition to its degree markings 48 and 49, disc 43 has formed on its inner planar surface 143 a large number of parallel lines 53, a central one of which may extend through axis 44 in the direction of zero marking 48, and the others of which are spaced evenly and fairly closely at opposite sides of axis 44 and across the entire width of the disc. These lines 53 may be scribed into the material of the disc, as parallel grooves therein, and preferably with paint of a color other than black (desirably red) contained in the grooves to render the lines clearly visible as a user looks at the chart through the disc and wall 36 (and without confusion with the usually black lines of the chart). On at least one of the parallel lines there is provided an arrow 148 indicating the direction of travel of a boat with respect to the lines.

For coaction with the peripheral degree markings 49 on disc 43, the transparent wall 36 carries an index marking 50, desirably in the form of an arrow pointing directly radially inwardly toward axis 44 at a location adjacent the periphery of disc 43. As seen in FIG. 7, this index marking may consist of a small colored piece of resinous plastic material, having a coating of pressure sensitive adhesive 52 at its underside, enabling adherance of element 50 to the transparent wall 36 at any point about the periphery of the disc, and with element 50 subsequently being adapted to be stripped from wall 36 and replaced and re-adhered to the wall at any changed location.

In using the device illustrated in the figures, assume first of all that no chart is initially present in the holder 24, but that it is desired to insert the particular chart illustrated at 29 in FIG. 2. This chart is slipped upwardly into the pocket formed by holder 24, and to the position illustrated in the other figures, following which the holder 24 and backing wall or element 25 are placed within recess 26 in the frame, and are retained therein by swinging of the holding elements 27 of FIG. 6 from the broken line position of that figure to the full line position of that figure. The frame 11 and carried parts may then be mounted on the bulkhead 14, as previously discussed.

It may be assumed at this point that the index marking 50 on transparent wall 36 has already been preset to a position representing the magnetic north pole for the particular area represented by chart 29. If a user of the device then desires to determine the magnetic course to be followed in travelling along a particular path between two different points on the chart, he merely turns disc 43 to a position in which the parallel lines 53 on the disc are parallel to the desired path of travel. For instance, in the setting of FIG. 1, these parallel lines have been turned to a position in which they extend in the same direction as a particular one of the course lines 33 on the chart, and specifically the course line 33a, with arrow 148 indicating the desired direction of travel along the course line. The provision of a large number of parallel lines on the disc assures that at least one of these lines will be received near the course line in question, so that the proper parallel relationship of the lines 53 and the course line can be easily determined. Also, the formation of disc 43 to be relatively large and to extend across substantially the entire face of the chart further assures proper positioning of at least one or more of the parallel lines 53 for effective reading in conjunction with the course line to be followed. After the disc has been turned to the proper setting, the magnetic course to be followed can be read directly from the markings 49 on the disc, by noting which of these markings is directly opposite index marking 50 on the transparent wall 36. Other courses may similarly be determined by turning the disc to appropriate settings for alignment of lines 53 with others of the courses indicated on the chart, or by turning the disc to positions in which lines 53 are parallel to another desired path of travel, which may not be indicated as a line on the chart, but which may be considered simply as an imaginary line joining together two locations on the chart, such as the point at which the boat happens to be at a particular time, and a certain landmark, or other critical point on the chart.

If the boat travels to another coastal area, another chart may be substituted in the holder, and the device will then indicate courses in the same manner in connection with the second chart. Normally, a boat will not often travel far enough to require resetting of the index marking 50 because of a change in the magnetic variation in the area. However, if the boat does travel far enough to alter the variation substantially, index marking 50 may be easily reset by merely turning disc 43 to a position in which the nearest one of its parallel lines 53 is parallel to the magnetic north-south line or arrow 35 of the compass rose 34 on the new chart, and with the disc thus set, moving index marking 50 to a position in which it is directly opposite the zero marking 48 on the disc. Thus, the index marking 50 then indicates the magnetic north on the new chart, so that the device may be used in conjunction with the new chart in the same manner discussed above.

If the chart does not have a magnetic compass rose, index marker 50 may be located by other means, as by first aligning the parallel lines of disc 43 with the true north line on the chart, then making a mark on wall 36, opposite the zero degree point on the disc, then turning the disc through a number of degrees corresponding to the magnetic variation, and finally attaching the index marker 50 to wall 36 opposite the new position of the zero marking on the disc.

Since some charts are so printed as to be properly read when their longer dimensions extend horizontally (rather than vertically as in FIG. 1), the frame 11 may if desired be designed for hanging in either of two different positions, that is, either in the FIG. 1 position or in a 90 degree turned position in which the long sides of the frame extend horizontally. For this purpose, frame 11 may carry, in addition to its brackets 12, a second and identical pair of brackets 12', mounted to parallel elements 22 and 23 respectively of the frame and engageable with two mounting screws in the same manner discussed in connection with brackets 12, to mount the frame in its second position. For use with the frame in that position, there may be provided a second of the index markers 50 (not shown) attached to wall 36 at a location offset 90 degrees from the illustrated first marker 50. Alternatively, a single marker may merely be moved through 90 degrees when the device is used in its horizontally elongated position.

Instead of attaching the index marker or markers 50 to wall 36 by pressure sensitive adhesive on their backs, these markers may be mounted in other ways for shifting movement between various different settings. One typical arrangement of this type is illustrated fragmentarily in FIG. 8, in which a marker element 50a typically formed of a small piece of metal, plastic or the like is mounted on an arcuate guide 151 projecting outwardly from wall 36a (corresponding to wall 36 of FIGS. 1–7), and is slidable along the guide arcuately, about the axis of disc 43a, through a sufficient angle (say between about 25 degrees to the right of true north and 25 degrees to the left of true north) to enable setting of the marker at any of the various positions which may be required to compensate for the magnetic variation in different geographical areas. The marker 50a may be releasably locked in any set position by tightening of a set screw 150a carried by the marker against the wall 36a. Guide 151 may be of dovetail cross section, and be received within a correspondingly dovetail groove or guideway in element 50a to retain element 50a against outward separation from guide 151.

In FIG. 8, the parallel lines 53a of disc 43a are illustrated as having mileage markings 153a at uniformly spaced locations therealong. These markings may be used to determine the mileage of a particular course to be traveled, by counting the number of marks 153a between two points, and then converting this to mileage by reference to a mileage line on the chart.

I claim:

1. A course indicator comprising a rectangular transparent wall to be received in front of a rectangular chart representing a particular geographical area, a transparent rotary circular disc positioned adjacent said transparent wall and in front of said chart at a location enabling the chart to be viewed through both the transparent wall and said disc simultaneously, a plurality of bearing members carried by said transparent wall at different locations about the periphery of said disc and engaging a circular peripheral edge of the disc in a relation connecting said disc to said wall for rotation relative thereto, a plurality of parallel markings on said element which may be turned into parallelism with a particular desired path of travel on the chart, a counterclockwise series of degree markings formed on said disc, an index marker carried by said transparent wall at a location offset from a position of parallelism with any edge of said transparent rectangular wall and at a location to indicate to a user the proper course in magnetic degrees to be maintained in order to travel along said path, said index marking having pressure sensitive adhesive at its rear side securable to said transparent wall in any position through 360 degrees about the axis of rotation of said disc, a second rectangular wall behind said first mentioned wall and peripherally secured thereto along only three edges of the walls to form a rectangular pocket between the walls into which a rectangular chart is insertible past a fourth edge of said walls in a relation holding said chart in fixed position in the pocket to be viewed through both said transparent wall and said disc, and enabling removal and replacement of said chart while said disc remains connected rotatively to the wall by said bearing members, a frame for receiving and holding said two walls with said two walls with said chart therebetween and said disc carried by the transparent wall, and means on the frame for attaching it to a bulkhead of a boat.

References Cited

UNITED STATES PATENTS

| | | | |
|---|---|---|---|
| 3,373,493 | 3/1968 | McDonald | 33—1 |
| 3,094,781 | 6/1963 | Vangor | 33—1 |

LEONARD FORMAN, Primary Examiner

R. A. FIELDS, Assistant Examiner